Feb. 19, 1935.　　　O. C. WATSON　　　1,991,830
OIL TREATING DEVICE
Filed June 6, 1932　　　2 Sheets-Sheet 1
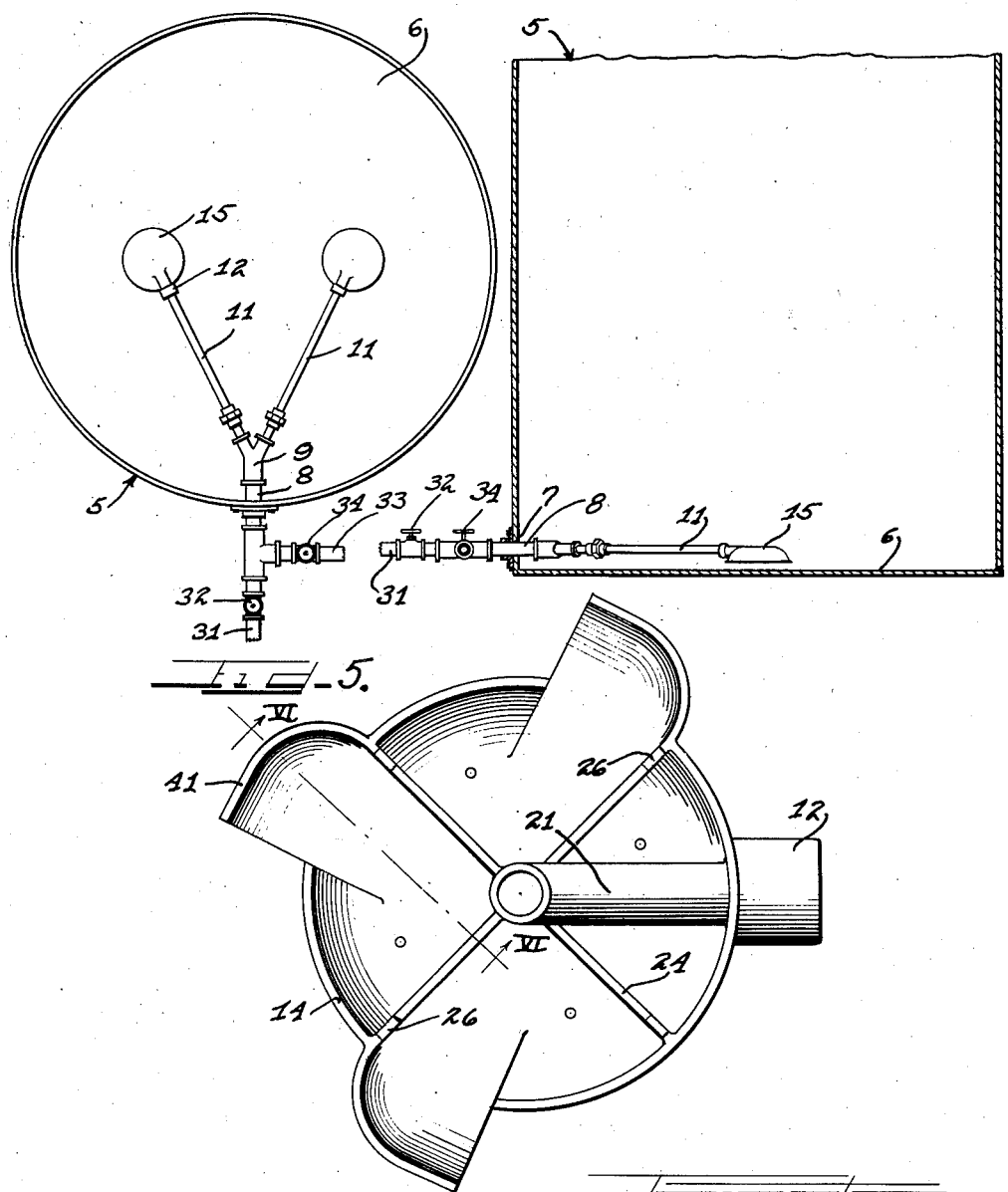

Feb. 19, 1935.    O. C. WATSON    1,991,830
OIL TREATING DEVICE
Filed June 6, 1932    2 Sheets—Sheet 2
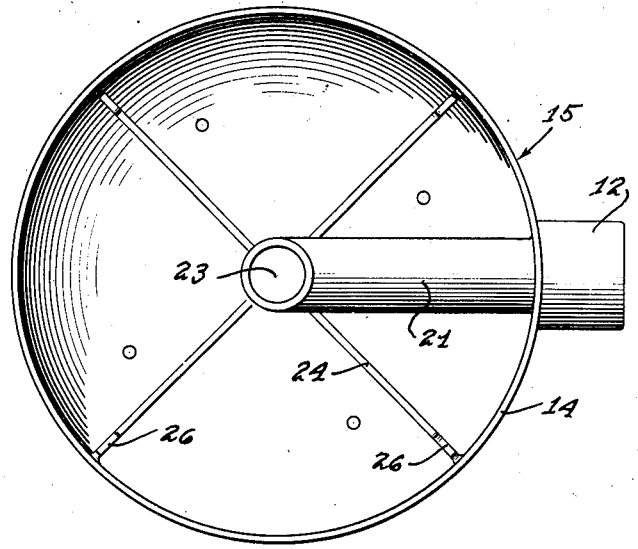
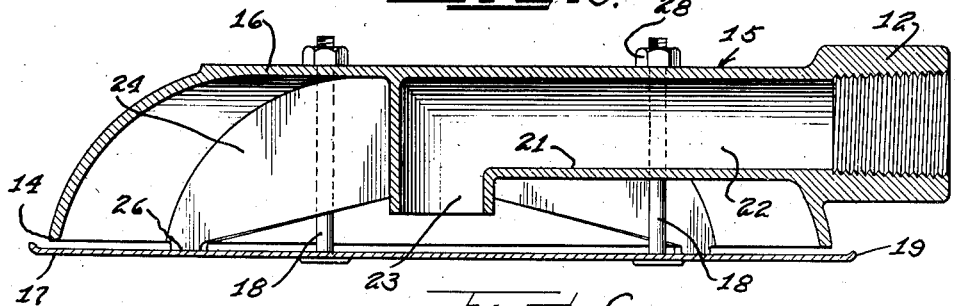
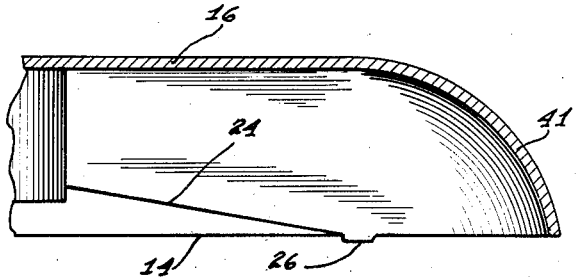
Inventor
Orville C. Watson.
by Charles H. Sills Atty.

Patented Feb. 19, 1935

1,991,830

UNITED STATES PATENT OFFICE 1,991,830

OIL TREATING DEVICE

Orville C. Watson, Oklahoma City, Okla., assignor of one-half to W. H. Elliott, Tulsa, Okla.

Application June 6, 1932, Serial No. 615,493

5 Claims. (Cl. 210—209)

This invention relates to an oil treating device and will be described as incorporated in a device associated with an oil storage tank, and adapted for the elimination of base sediment from the oil.

An object of this invention is the provision of an improved device of the character identified which is adapted to very effectively remove sediment from the bottom of a tank without disturbing the oil in the tank.

Another object is the provision of such a device for eliminating the base sediment without causing a whirling action of the same and adapted to effectively prevent the oil above the base sediment from breaking through the sediment and escaping through the sediment removing device.

A further object of this invention is the provision of such a device which is adapted to introduce steam under pressure into a tank of oil and cause an upward rolling action of the oil while heating the same to precipitate material in suspension in the oil in order that it may be subsequently drawn off.

Other objects and advantages of this invention will become apparent from the following detail description with reference to the accompanying drawings.

Figure 1 is a top plan view of an open oil tank illustrating my invention incorporated therein.

Figure 2 is a vertical section through a fragment of that shown in Figure 1 illustrating my invention in elevation.

Figure 3 is a vertical section through a preferred form of the draw-off unit incorporated in my invention.

Figure 4 is a bottom plan view of that shown in Figure 3, with the baffle plate and securing bolts removed.

Figure 5 is a view similar to Figure 4 illustrating a modified form of draw-off unit with the baffle plate removed; and Figure 6 is a section through a fragment of that shown in Figure 5 and taken on the line VI—VI of Figure 5.

It is a well known fact to those skilled in the art that some oil as taken from the oil wells contains materials in suspension which when the oil is placed in a tank, settles to the bottom, and in the course of time accumulates to such an extent that it must be removed from the tank. It is the purpose of this invention to provide a device not only for removing the sediment from the tank while protecting it from the column of oil above the sediment, but for additionally facilitating the heating and treatment of the oil to cause materials in the oil to precipitate or settle so that this sediment may be drawn off and in such a way as to avoid the necessity of opening the tank to clean it out from above.

When oil, as it leaves the well, is found to be of such a character that it will be necessary to heat treat or agitate the same in the tank to cause a settling of the foreign material therein, it is the practice to introduce suitable chemicals into the oil at some point between the well and the settling tank, such that when the oil is heat treated or agitated in the tank, the chemicals thus introduced will become active and cause such a separation of the foreign materials in the oil that they will readily settle to the bottom. My invention as hereinbefore indicated is of such a character that it facilitates the heat treatment of the oil and simplifies the removal of the foreign material as base sediment after it has settled.

My invention as herein illustrated comprises an oil tank 5 having a horizontal bottom 6. An opening 7 at one side of the tank is provided through which a conduit 8 enters the tank. If the tank is relatively large as herein illustrated, the conduit 8 may be divided by a Y 9 and extend as two smaller conduits 11 having threaded engagement with the boss 12 on one edge of the oil treating and sediment removing units 15 shown in detail in Figures 4 and 3. A unit 15 comprises a downwardly dished pressure resisting shield 16 having its lower edge in a plane substantially parallel with the bottom 6 of the tank and spaced a short distance thereabove to facilitate movement of the sediment entering the shield. The lower edge 14 of the shield is disposed adjacent and in a plane parallel to the plane of a baffle plate 17 fixed to the shield by suitable bolts 18. The baffle 17 is substantially flat having at its edge an integrally formed upwardly curved flange 19. The shield 16 has formed integrally therewith a conduit 21 providing a passageway 22 opening downwardly at 23 in substantially the center of the shield and through which steam under pressure may be forced into the device and through which sediment laden fluid may be withdrawn from the device.

In order to prevent a whirling action of the sediment and fluid as it enters between the shield 16 and the baffle plate 17, vertically positioned and radially extending fins 24 are formed integrally with the shield 16 and are provided with feet 26 extending a short distance below the lower edge 14 of the shield 16. The baffle plate 17 is held in spaced relation with the lower edge of the shield 16 by means of the feet 26 against which the baffle plate 17 is tightly held by the bolts 18 having nuts 28 on their upper ends engaging the top of the shield.

As illustrated in Figures 1 and 2, the conduit 8 has communication with a draw-off conduit 31 through a suitable valve 32 and communication with a steam conduit 33 through a valve 34. These valves are actuated as may be desired either for the purpose of admitting steam to the device, or for the purpose of withdrawing sediment through the conduit 31, as the situation may require.

In the modification of my invention shown in Figures 5 and 6, I have provided the shield 16 with vanes 41 suitably curved to provide a centrifugal action of the steam as it is forced through the shield from the conduit 21. This centrifugal action causes the oil in the tank to rotate and thoroughly mix the steam with the oil for heating the same as hereinbefore described. The motion of the oil caused by steam escaping from the form of my invention shown in Figures 3 and 4, is a rolling action, as distinguished from a centrifugal action.

It will be appreciated by those skilled in the art that this invention is susceptible of various forms and modifications without departing from the principle thereof, and I desire that the patent to be granted hereon shall not be limited in any manner except as required by the prior art.

Although I have herein referred to this invention as an oil treating device, it will be understood that the invention may be employed in the treating or blending of oil or other fluid, chemicals or other substances used in other industries as well as in the oil industry. Where I have herein referred to the introduction of steam to heat the oil, it will be understood that I may use steam, gas, air, water, chemicals or other substances for heating, blending or agitating the liquid in the tank or container as may be preferable under the circumstances.

I claim as my invention:

1. A sediment remover of the class described comprising a shield, conduit means associated with said shield and adapted for removing sediment laden fluid from beneath said shield, a baffle plate disposed in spaced relation with the lower edge of said shield to permit entrance of fluid therebetween in a substantially horizontal plane, means whereby steam under pressure may be introduced through said conduit means and flange means on the edge of said baffle plate for directing the steam upwardly to cause a rolling action of liquid in which the device may be immersed.

2. An oil treating and sediment removing device of the class described comprising opposed pressure resisting members disposed adjacent and in spaced relation to each other and having their adjacent edges in parallel planes, conduit means for selectively drawing sediment laden liquid from between said members and for introducing steam under pressure therebetween, and flange means on one of said members for causing steam escaping from between said members to produce an upward rolling action of the oil in which the device may be immersed.

3. An oil treating and sediment removing device of the class described comprising opposed pressure resisting members disposed adjacent and in spaced relation to each other and having their adjacent edges in parallel planes, conduit means for selectively drawing sediment laden liquid from between said members and for introducing steam under pressure therebetween, and vanes on one of said members for causing steam escaping from between said members to produce a centrifugal movement of the oil in which the device may be immersed.

4. An oil treating and sediment removing device of the class described comprising opposed pressure resisting members disposed adjacent and in spaced relation to each other and having their adjacent edges in parallel planes, conduit means for selectively drawing sediment laden liquid from between said members and for introducing steam under pressure therebetween, flange means on one of said members for causing steam escaping from between said members to produce an upward rolling action of the oil in which the device may be immersed vertically positioned, and fins disposed between said members for preventing whirling movement of liquid entering therebetween.

5. In a device for treating oil and for removing base sediment from a tank of oil, a draw-off conduit leading into the tank, a sediment remover unit in said tank comprising a downwardly dished pressure shield, means on the under side of said shield for restraining rotary movement of sediment passing through the shield, said shield having a relatively large passageway opening downwardly at the center of the shield and having communication with said draw-off conduit, means for introducing steam under pressure into said conduit for heating oil in which the device may be immersed, means for preventing rotary movement of sediment comprising vertically positioned radially extending fins formed integral with said shield, and a baffle plate disposed beneath said shield and secured in engagement with the lower edge of said fin.

ORVILLE C. WATSON.